United States Patent [19]

Myers et al.

[11] Patent Number: 5,307,245
[45] Date of Patent: Apr. 26, 1994

[54] FIBER OPTIC BACKLIGHTING PANEL AND ZIG-ZAG PROCESS FOR MAKING SAME

[75] Inventors: J. Michael Myers, Newport Beach; Roger F. Halter, Santa Ana, both of Calif.

[73] Assignee: Poly-Optical Products, Inc., Irvine, Calif.

[21] Appl. No.: 66,324

[22] Filed: May 21, 1993

Related U.S. Application Data

[63] Continuation of Ser. No. 926,563, Aug. 6, 1992, abandoned, which is a continuation of Ser. No. 722,723, Jun. 27, 1991, abandoned.

[51] Int. Cl.⁵ .................................................. F21V 8/00
[52] U.S. Cl. .......................................... 362/32; 65/2; 65/4.2
[58] Field of Search .............. 362/32, 31; 65/10.1, 65/63, 105, 112, 174, 271, 2, 3, 4.2, 4.21; 359/42

[56] References Cited

U.S. PATENT DOCUMENTS

| | | | |
|---|---|---|---|
| 2,909,857 | 10/1959 | Wilson | 40/502 |
| 3,247,755 | 4/1966 | Siegmund | 65/4.21 |
| 3,592,199 | 7/1971 | Ostensen | 128/6 |
| 3,692,383 | 9/1972 | Herod et al. | 385/147 |
| 3,829,675 | 8/1974 | Mariani | 362/296 |
| 3,886,544 | 5/1975 | Narodny | 340/365 P |
| 4,052,120 | 10/1977 | Sick et al. | 385/33 |
| 4,124,879 | 11/1978 | Schoemer | 362/26 |
| 4,128,332 | 12/1978 | Rowe | 355/67 |
| 4,139,261 | 2/1979 | Hilsum | 385/120 |
| 4,141,058 | 2/1979 | Mizohata et al. | 362/32 |
| 4,141,161 | 2/1979 | Hiscock et al. | 40/547 |
| 4,142,312 | 3/1979 | Stokes | 40/336 |
| 4,172,631 | 10/1979 | Yevick | 385/115 |
| 4,173,390 | 11/1979 | Kach | 385/44 |
| 4,177,501 | 12/1979 | Karlin | 362/26 |
| 4,195,907 | 4/1980 | Zamja et al. | 385/125 |
| 4,196,962 | 4/1980 | Sick | 385/146 |
| 4,214,391 | 7/1980 | Angst | 40/451 |
| 4,234,907 | 11/1980 | Daniel | 362/32 |
| 4,389,085 | 6/1983 | Mori | 359/591 |
| 4,389,698 | 6/1983 | Cibie | 362/32 |
| 4,420,740 | 12/1983 | Brown et al. | 340/28 |
| 4,422,719 | 12/1983 | Orcutt | 385/123 |
| 4,459,642 | 7/1984 | Mori | 362/32 |
| 4,471,412 | 9/1984 | Mori | 362/32 |
| 4,519,017 | 5/1985 | Daniel | 362/32 |
| 4,535,396 | 8/1985 | Guthrie | 362/293 |
| 4,544,990 | 10/1985 | Wieselman et al. | 362/32 |
| 4,555,694 | 11/1985 | Yanagishima et al. | 340/524 |
| 4,559,583 | 12/1985 | Ku | 362/32 |
| 4,561,043 | 12/1985 | Thompson | 362/32 |
| 4,585,298 | 4/1986 | Mori | 385/31 |
| 4,636,028 | 1/1987 | Mori | 385/4 |
| 4,640,592 | 2/1987 | Nishimura et al. | 385/125 |
| 4,670,633 | 6/1987 | Kaiwa et al. | 200/314 |

(List continued on next page.)

FOREIGN PATENT DOCUMENTS

56-32104  4/1981  Japan .

Primary Examiner—Richard R. Cole
Assistant Examiner—L. Heyman
Attorney, Agent, or Firm—Robbins, Berliner & Carson

[57] ABSTRACT

An improved fiber optic backlighting panel provides uniform and increased background illumination in devices, such as rubber keypads, membrane switches, liquid crystal displays, rigid panels or the like. The fiber optic panel comprises a light source and a layer of optical fibers arranged adjacent each other, which transmit light to different locations throughout the device, thereby providing efficient background illumination relative to the amount of light beamed in. The optical fibers are selectively terminated at these locations by forming a series of angular cuts through the layer of optical fibers with a laser, according to a predetermined geometric zig-zag or sawtooth pattern stored in a computer memory. The zig-zag pattern extends across the entire length and width of the panel such that each optical fiber is cut only once to provide increased and consistent illumination throughout the device. In one specific embodiment, for application in liquid crystal displays, a layer of foam is used to diffuse the light to provide uniform illumination.

14 Claims, 2 Drawing Sheets

U.S. PATENT DOCUMENTS

| | | | |
|---|---|---|---|
| 4,673,918 | 6/1987 | Adler et al. | 340/365 P |
| 4,678,279 | 7/1987 | Mori | 362/32 |
| 4,685,766 | 8/1987 | Nishimura et al. | 385/125 |
| 4,693,552 | 9/1987 | Jeskey | 303/105 |
| 4,699,448 | 10/1987 | Mori | 385/25 |
| 4,717,226 | 1/1988 | Mori | 385/39 |
| 4,726,641 | 2/1988 | Mori | 385/39 |
| 4,730,883 | 3/1988 | Mori | 362/32 |
| 4,732,442 | 3/1988 | Mori | 362/32 |
| 4,733,332 | 3/1988 | Yamashita et al. | 362/32 |
| 4,747,648 | 5/1988 | Gilliland, III | 40/463 |
| 4,761,047 | 8/1988 | Mori | 128/379 |
| 4,763,984 | 8/1988 | Awai et al. | 385/31 |
| 4,765,701 | 8/1988 | Cheslak | 362/32 |
| 4,779,166 | 10/1988 | Tanaka et al. | 362/31 |
| 4,786,139 | 11/1988 | Sedlmayr | 385/120 |
| 4,822,123 | 4/1989 | Mori | 385/31 |
| 4,830,899 | 5/1989 | Nakahashi et al. | 428/137 |
| 4,845,596 | 7/1989 | Mouissie | 362/26 |
| 4,883,333 | 11/1989 | Yanez | 362/32 |
| 4,952,022 | 8/1990 | Genovese | 350/96.24 |
| 4,977,487 | 12/1990 | Okano | 362/32 |
| 5,005,108 | 4/1991 | Pristash et al. | 362/26 |
| 5,036,435 | 7/1991 | Tokuda et al. | 362/31 |

FIBER OPTIC BACKLIGHTING PANEL AND ZIG-ZAG PROCESS FOR MAKING SAME

This application is a continuation of application Ser. No. 07/926,563, filed Aug. 6, 1992, abandoned, which was a continuation of application Ser. No. 07/722,723, filed Jun. 27, 1991, abandoned.

FIELD OF THE INVENTION

The present invention relates generally to the field of providing background illumination in devices, such as rubber keypads, membrane switches, liquid crystal displays, rigid panels or the like. More specifically, the present invention relates to an improved fiber optic backlighting panel for providing increased and uniform background illumination throughout the device and a zig-zag process for making the same, by providing angular cuts throughout the length and width of the panel with a laser according to a predetermined zig-zag geometric pattern stored in a computer memory.

BACKGROUND OF THE INVENTION

Background illumination, otherwise referred to as backlighting, is commonly used in information display units, rubber keypads, membrane switches, liquid crystal displays, rigid panels and the like, to make them more discernible and to enhance their visibility. Some existing techniques utilize fiber optics for this purpose.

Typically, such prior backlighting devices utilize a plurality of optical conductors, each having a core surrounded by cladding, which are placed in intimate proximity to each other above an optically reflecting surface. Light is beamed into the optical conductors at one end using a simple light source, such as a lamp. The light beamed in is propagated in the core of the optical conductor by means of partial internal refraction.

In accordance with one prior technique, at a desired location on a portion of the optical conductors positioned behind the panel to be illuminated, abrasions are formed in the surface, typically by using a hot stamping machine. The stamping machine forms the abrasions by pressing against the optical conductors at the desired locations, in a random manner. As the light passes down the optical conductors, a portion of the light exits through each of the abrasions in the surface and illuminates the location directly above that region. Typically, the remaining light continues its travel along the optical conductors and terminates at a location remote from the abrasions, thus creating inefficient illumination in the abraded area.

U.S. Pat. No. 4,845,596 to Moussie discloses one such technique whereby an outer sheath of the optical conductor is removed locally and a portion of the light beamed through the optical conductors escapes therefrom at those points. This emerging light reflects off the reflective backing and illuminates the surface above.

In such prior devices, the light which exits through the abrasions in the surface provides backlighting of relatively low efficiency relative to the amount of light beamed in. Also, the intensity of light along the fiber optic cable diminishes as light is refracted through the abrasions along the fiber optic cable. Moreover, some light continues to the end. Thus, although such prior devices are known to serve their purpose, they have not proven to be satisfactory.

In accordance with yet another technique, optical conductors are held together by a thread which is tightly woven around the optical conductors, thereby creating corrugations, the angled sides of which exceed the acceptance angle or numerical aperture of the cladding and allow some of the light beamed through to escape. The amount of light which escapes can be limited by controlling the tightness of the weave. In applications not requiring diffusion, such optical conductors, in addition to providing relatively low intensity of light, are difficult to use behind key pads due to their thickness.

Most of the prior techniques involve manually placing staggered layers of optical conductors which has proved to be laborious, inefficient and economically unfeasible.

A need thus exists for an improved fiber optic backlighting panel and technique for making fiber optic panels for providing increased and uniform background illumination in a device relative to the amount of light beamed in.

SUMMARY OF THE INVENTION

The present invention is directed to an improved fiber optic backlighting panel for providing uniform and increased background illumination in devices, such as rubber keypads, membrane switches, liquid crystal displays, rigid panels or the like, and a novel technique for making the same.

In a preferred embodiment of the invention, the fiber optic panel comprises a light source, and a layer of optical fibers arranged adjacent each other which transmit the light from the source to different locations throughout the device to uniformly distribute the light.

Each of the optical fibers are selectively terminated at different locations by forming a series of angular cuts through the layer of optical fibers with a laser beam from a laser engraver, according to a predetermined geometric zig-zag or sawtooth pattern stored in a computer memory. The zig-zag pattern extends across the entire length and width of the panel such that each optical fiber is only cut once so as to provide increased and consistent illumination throughout the panel. The laser beam cuts completely through the optical fiber at locations corresponding to the predetermined zig-zag pattern. This technique solves the problem of cutting fibers twice or missing a fiber. The laser is activated according to the predetermined zig-zag pattern by a CAD (computer aided design) program.

In still another aspect of the invention, for specific application in liquid crystal displays, the light is transmitted through a layer of foam to provide uniform illumination by diffusing the light.

These as well as other steps of the preferred embodiment will become apparent from the detailed description which follows, considered together with the appended drawings.

BRIEF DESCRIPTION OF THE DRAWINGS

A preferred embodiment of the present invention is shown in the following drawings, in which like reference numerals indicate like parts and in which.

DETAILED DESCRIPTION OF THE PREFERRED EMBODIMENT

Figure 1:
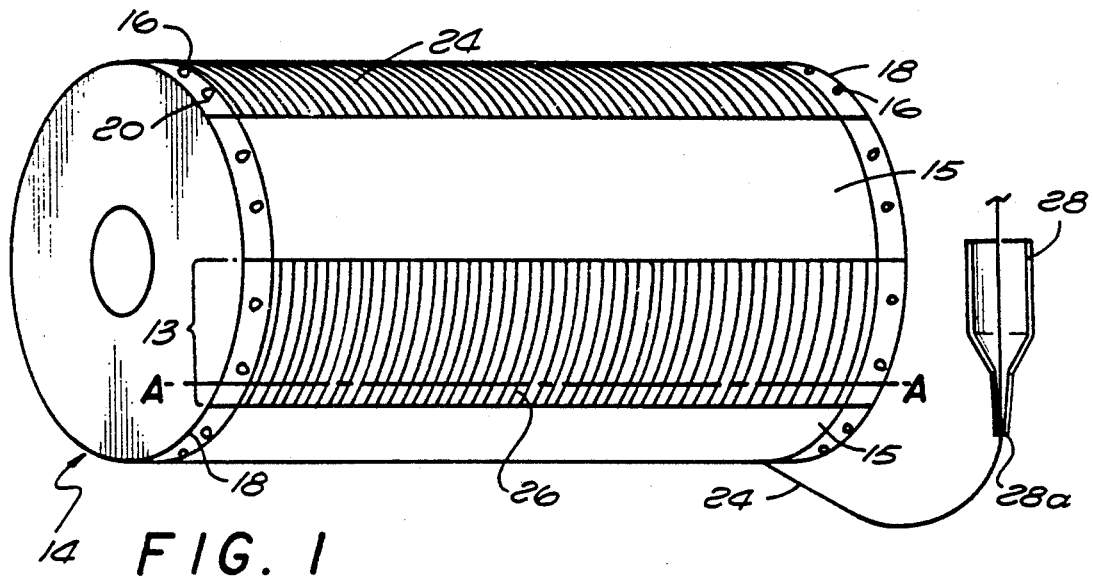
FIG. 1 is a perspective view of a winding drum, showing the manner in which a single optical fiber is wrapped around the drum, in consecutive turns, to form a layer of optical fibers arranged proximate each other, and strips of reflective material are secured to the winding drum by upright pegs.
Figure 2:
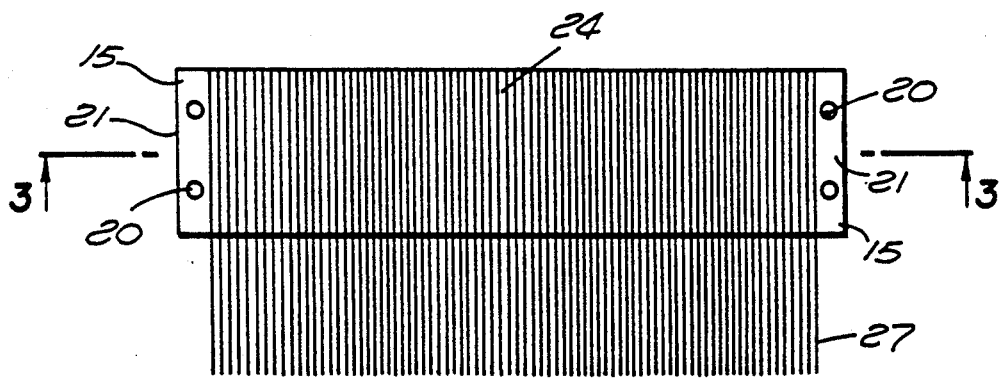
FIG. 2 is a plan view of a backlighting panel, showing the manner in which the layer of optical fibers around the winding drum is cut.

FIGS. 1 and 2 show generally the technique for making an improved fiber optic backlighting panel 10 (shown in FIG. 4) in accordance with the present invention. The improved fiber optic backlighting panel constructed in accordance with the novel technique provides increased and uniform background illumination in devices, such as rubber keypads, membrane switches, liquid crystal displays, rigid panels or the like. The backlighting panel 10, when manufactured in accordance with the technique of the present invention, advantageously provides an even and increased distribution of background illumination throughout the device in order to enhance perceptibility.

Figure 3:
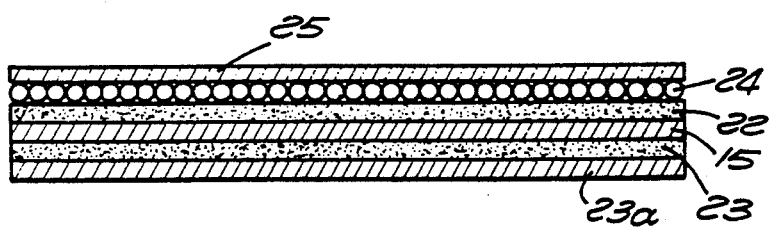
FIG. 3 is a cross sectional view taken along line 3—3, showing the various layers comprising the backlighting panel (the layers shown in FIG. 3 are of equal dimension for purposes of illustration only and do not represent actual dimensions)

Referring to FIGS. 1, 2 and 3, a single optical fiber 24 from a spool (not shown) is wrapped around a winding drum 14 or the like, which is cylindrical in shape, in consecutive turns to form a layer of optical fibers 24 arranged adjacent each other. As best shown in FIG. 3, the optical fibers 24 are arranged in intimate proximity to each other. The optical fiber 24 can be of any commercially available type and can have any suitable diameter. For example, the optical fiber 24 has a diameter of 10 mils (thousands of an inch).

To prevent the consecutive turns of the optical fiber 24 from overlapping, the optical fiber 24 is guided from the spool to the winding drum 14 by a positioning eyelet 28. The positioning eyelet 28 is preferably a needle-like device, having a central orifice 28a for receiving the optical fiber 24. In a preferred embodiment, the central orifice 28a has a diameter greater than the diameter of the optical fiber, preferably 11 mils. The position of the eyelet 28 is controlled by a linear motor (not shown) which in turn is controlled by a computer system 29 (shown in FIG. 4).

After the optical fiber 24 is wound around the winding drum 14, any overlapping of the optical fibers 24 can be adjusted manually. Alternatively, the winding of the optical fiber 24 itself can be controlled manually or in accordance with any other technique known for wrapping wire around a spool.

Strips of a suitable reflective backing 15, such as mylar or the like, are positioned at spaced intervals, indicated at 13, around the winding drum 14. The strips of reflective backing 15 can be of any suitable width desired by those skilled in the art. The winding drum 14 has a plurality of upright pegs or other such protruding means, indicated at 16, disposed at evenly spaced locations about its peripheral ends 18. The pegs 16 project along an axis perpendicular to the axis along which the optical fibers 24 extend.

The strips of reflective backing 15 have registration holes 20 (best shown in FIG. 2) formed at their ends 21. The registration holes 20 are punched preferably at the time of manufacturing or before the strips of reflective backing 15 are positioned around the drum 14. The strips of reflective backing 15 are secured to the winding drum 14 by anchoring the registration holes 20 over the pegs 16.

Referring to FIG. 3, the reflective backing 15 is adhered onto the layer of optical fibers 24 by a layer of adhesive 22 applied on a surface of the reflective backing facing the optical fibers 24. The layer of adhesive 22 is applied prior to positioning the strips of reflective backing 15 around the drum 14. The adhesive 22 is preferably a suitable conventional adhesive. The reflective backing 15 can also optionally have a layer of adhesive 23 on its back surface to facilitate mounting the backlighting panel 10 to a surface, such as a circuit board. A release paper 23a placed over the layer of adhesive 23 to the reflective backing 15 advantageously protects the adhesive 23. Thus, prior to mounting the backlighting panel 10 onto a surface, the release paper 23a is simply peeled away.

Each of the strips of reflective backing 15 is subsequently removed from its respective pegs 16, by severing the layer of optical fibers 24 in the spaces 13 extending between two strips of reflective backing 15. For example, the layer of optical fibers 24 can be severed along the broken line A—A. The reflective backing 15 now has free ends 27 of the layer of optical fibers 24 extending therefrom. Alternatively, the layer of optical fibers 24 extending between two strips of reflective backing 15 can be cut at one location and the entire arrangement removed from the winding drum 14 before each of the strips 15 are individually separated. The strips 15 can be cut vertically or horizontally as desired to create panels of any size.

Figure 4:
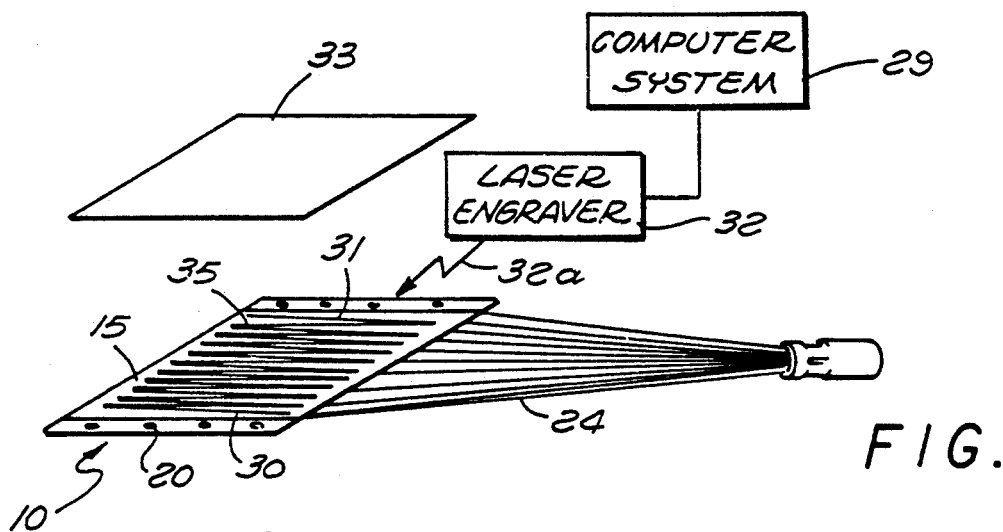
FIG. 4 is a schematic representation of the backlighting panel, a laser engraver and a computer system, showing the manner in which the laser engraver makes angular cuts across the layer of optical fibers, according to a predetermined zig-zag pattern.
Figure 5:
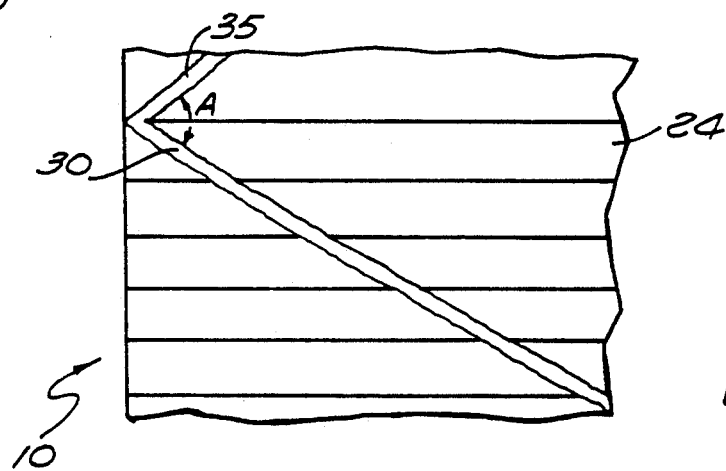
FIG. 5 is an exploded view of a fragmentary portion of the backlighting portion shown in FIG. 4.
Figure 6:
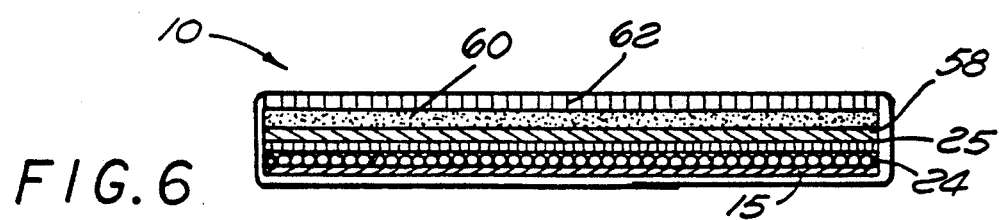
FIG. 6 is a schematic cross sectional representation of the layers in the backlighting panel for specific application in a LCD.

Referring now to FIGS. 4 and 6, the layer of optical fibers 24 are selectively terminated at a plurality of different locations on the upper surface of the reflective backing 15. This is achieved by forming angular cuts 30 with a laser engraver 32, which can be of any conventional type. The laser engraver 32 forms the angular cuts 30 by directing a laser beam, indicated at 32a, across the layer of optical fibers 24. In order to ensure that the optical fibers 24 are cut angularly, the backlighting panel 10 is properly aligned by the registration holes 20, which prevent the panel 10 from being misaligned by any inadvertent movement. The laser beam 32a is directed by a CAD (computer aided design) program to cut the optical fibers 24 according to a zig-zag or sawtooth geometric pattern, indicated at 31. The CAD program can be executed by the computer 29, of any conventional type, which controls the laser engraver 32a. The zig-zag or sawtooth geometric pattern 31 is mapped and stored in a computer memory (shown as part of the computer 29).

The angular cuts 30 according to the zig-zag pattern 31 preferably extends across the entire width and length of backlighting panel 10. Preferably, the number of angular cuts 30 are maximized to increase illumination. However, if converging lines 35 of the zig-zag pattern 31 are too close, there is a greater risk of inadvertently forming misaligned angular cuts. Thus, in the preferred embodiment, the converging lines 35 of the zig-zag pattern intersect at an angle A, preferably in the range of 3-5 degrees, to avoid misalignment of fibers 24 or the risk of inadvertently cutting the wrong fiber, as shown in FIG. 6. Thus, each fiber 24 is completely cut through once, thereby maximizing efficiency. Also, the zig-zag pattern provides maximum uniformity. This technique generally avoids the problem of cutting optical fibers 24 twice or missing an optical fiber 24.

Referring again to FIG. 3, once all the angular cuts 30 are formed, a sheet of clear plastic 25, preferably clear Mylar, is laminated over the layer of optical fibers 24.

The fiber optic backlighting panel 10 has been primarily described herein for providing backlighting in a display panel, indicated at 33 or the like. However, the invention may also be used to provide backlighting in membrane switches, liquid crystal displays (LCDs), rigid panels, vehicle panels and other devices which will be obvious to those skilled in the art.

Figure 7:
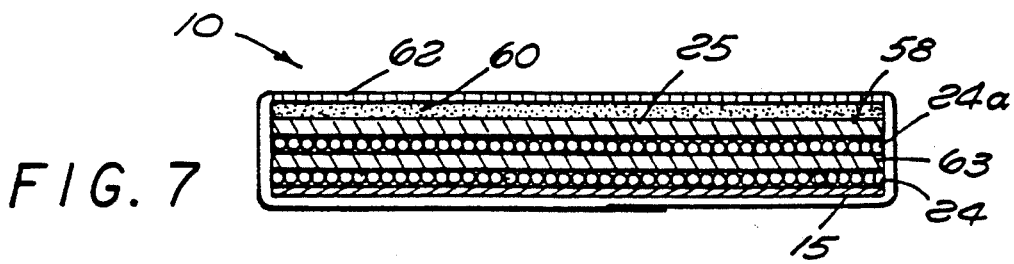
FIG. 7 is a schematic cross sectional representation of the layers in the backlighting panel for specific application in a LCD showing two layers of optical fibers.

Referring now to FIGS. 6 and 7, in a specific application, the backlighting panel 10 is used to provide uniformly distributed background illumination in a LCD. An adhesive layer 58 is applied over the reflective backing 15, the layer of optical fibers 24 and the clear plastic 25. A layer of foam 60, preferably polyethylene or the like, is securely disposed over the adhesive layer 58, which is again covered with another sheet of clear plastic 62, preferably Mylar. The sheet of plastic 62 can be wrapped around all the other layers to keep all the layers intact.

The bubble-like formations in the foam 60 scatter the light, causing it to diffuse so as to provide uniform illumination or glow throughout the device. The foam is preferably white in color and translucent. The density of the bubbles is preferably 0.35 gm/cubic inch and the foam 62 is preferably 25% to 30% transmissive.

As shown in FIG. 7, two or more different layers of optical fibers 24 can also be used. A layer of adhesive 63 is applied over the reflective backing 15 and layer of optical fibers 24. Over the layer of adhesive 63, a second layer of optical fibers 24a is arranged in accordance with the technique described previously. The clear plastic 25, preferably Mylar, is laminated over the second layer of fibers 24a. A layer of adhesive 58 is applied over the clear plastic 25. The diffuser foam 60 is disposed over the layer of adhesive 58 and the sheet of clear plastic, preferably Mylar, is again laminated over the diffuser foam 60.

Although the invention has been described in terms of a preferred embodiment thereof, other embodiments that are apparent to those of ordinary skill in the art are also within the scope of the invention. Accordingly, the scope of the invention is intended to be defined only by reference to the appended claims.

What is claimed is:

1. A method for making a fiber optic backlighting panel to provide efficient and uniform background illumination of a surface comprising the step of:
   providing a layer of optical fibers, said optical fibers arranged in proximity to each other; and
   cutting through the layer of optical fibers to form cuts at locations corresponding to a predetermined zig-zag pattern so that each fiber is cut through at only one location.

2. A method for making a fiber optic backlighting panel to provide efficient and uniform background illumination of a surface as defined in claim 1, further comprising the step of:
   cutting each fiber only once;
   providing a reflective backing; and
   adhering said layer of optical fibers to said reflective backing.

3. A method for making a fiber optic backlighting panel to provide efficient and uniform background illumination of a surface as defined in claim 1, further comprising the step of:
   placing a layer of diffusing material over said layer of optical fibers to provide diffuse illumination.

4. A method for making a fiber optic backlighting panel to provide efficient and uniform background illumination of a surface as defined in claim 1, further comprising the step of:
   forming angular cuts across the width and length of said layer of optical fibers according to said zig-zag pattern to provide uniform and consistent illumination throughout the surface.

5. A method for making a fiber optic backlighting panel to provide efficient and uniform background illumination of a surface as defined in claim 1, further comprising the step of:
   forming said layer of optical fibers by winding a single optical fiber in consecutive turns;
   arranging said optical fibers adjacent each other without any overlapping of said turns.

6. A method for providing efficient and uniform background illumination of a surface, comprising the steps of:
   providing a layer of optical fibers;
   selectively terminating each optical fiber in said layer by making cuts with a laser beam in each of said optical fibers according to a predetermined zig-zag pattern; and
   beaming light from a light source through said layer of optical fibers to a plurality of different locations on the surface, said cuts enabling the light conducted by the optical fibers to exit therefrom and provide uniform illumination throughout the surface.

7. A method for making a fiber optic backlighting panel to provide efficient and uniform background illumination of a surface comprising the steps of:
   providing a winding drum having a plurality of pegs disposed about peripheral ends thereof;
   wrapping an optical fiber around said winding drum and forming a layer of consecutive turns of said optical fiber;
   securing strips of reflective backing having registration holes formed therein to said pegs;
   cutting consecutive turns of said layer of optical fiber between said peg, thereby forming a layer of optical fibers;
   removing said strips of reflective backing from said pegs; and
   aligning said strip with said registration holes and directing a laser beam over said strip to make cuts in said layer of optical fibers according to a predetermined zig-zag pattern.

8. An improved fiber optic panel for providing efficient and consistent background illumination of a surface, comprising:
   a layer of optical fibers for transmitting light to a plurality of different locations on the surface, said optical fibers having cuts formed by a laser beam according to a zig-zag pattern, the cuts terminating each optical fiber once to provide efficient and uniform illumination of the surface.

9. An improved fiber optic panel for providing efficient background illumination of a surface as defined in claim 8, further comprising:
means for diffusing disposed over said layer of optical fibers to diffuse the light to provide uniform illumination throughout the surface.

10. An improved fiber optic panel for providing efficient background illumination of a surface as defined in claim 9, wherein said diffusing means is a layer of polyethylene foam.

11. An improved fiber optic panel for providing efficient background illumination of a surface as defined in claim 9, wherein said layer of optical fibers is adhered to a reflective backing.

12. An improved fiber optic panel for providing background illumination of a surface, comprising:
a layer of optical fibers for transmitting light to a plurality of different locations on the surface, said optical fibers having cuts formed therethrough according to a predetermined zig-zag pattern of locations, said cuts selectively terminating each optical fiber directly below a respective one of said different locations.

13. An improved fiber optic panel for providing background illumination of a surface as defined in claim 12, wherein said cuts completely cut through said optical fibers.

14. An improved fiber optic panel for providing background illumination of a surface as defined in claim 12, wherein each optical fiber is cut only once.

* * * * *